United States Patent
Eusemann et al.

(10) Patent No.: US 8,233,683 B2
(45) Date of Patent: Jul. 31, 2012

(54) METHODS FOR NON-LINEAR IMAGE BLENDING, ADJUSTMENT AND DISPLAY

(75) Inventors: Christian Eusemann, Rochester, MN (US); David Holmes, Rochester, MN (US)

(73) Assignees: Siemens Aktiengesellschaft, Munich (DE); Mayo Foundation for Medical Education and Research, Rochester, MN (US)

( * ) Notice: Subject to any disclaimer, the term of this patent is extended or adjusted under 35 U.S.C. 154(b) by 1288 days.

(21) Appl. No.: 11/976,129

(22) Filed: Oct. 22, 2007

(65) Prior Publication Data

US 2009/0052727 A1 Feb. 26, 2009

Related U.S. Application Data

(60) Provisional application No. 60/935,675, filed on Aug. 24, 2007.

(51) Int. Cl.
*G06K 9/10* (2006.01)

(52) U.S. Cl. .......................... 382/128; 382/100; 382/254
(58) Field of Classification Search .................. 382/128
See application file for complete search history.

(56) References Cited

U.S. PATENT DOCUMENTS

| | | | | |
|---|---|---|---|---|
| 2004/0101104 A1* | 5/2004 | Avinash et al. | ............ | 378/98.12 |
| 2005/0110802 A1* | 5/2005 | Avinash | ........................ | 345/629 |
| 2006/0228036 A1* | 10/2006 | Avinash | ........................ | 382/254 |

* cited by examiner

*Primary Examiner* — Phillip A Johnston
(74) *Attorney, Agent, or Firm* — Harness, Dickey & Pierce, P.L.C.

(57) ABSTRACT

A method for generating and adjusting an image obtained based on computed tomography data using a non-linear blending function is provided. In one embodiment of the method, first image data is obtained using a first X-ray energy, and second image data is obtained using a second X-ray image energy. An image is generated by blending the first and second image data using the non-linear function. The first X-ray energy and the second X-ray energy are different.

22 Claims, 4 Drawing Sheets (a)

(b)

METHODS FOR NON-LINEAR IMAGE BLENDING, ADJUSTMENT AND DISPLAY

CROSS REFERENCE TO RELATED APPLICATIONS

This non-provisional U.S. patent application claims priority under 35 U.S.C. §119(e) to provisional application No. 60/935,675 filed on Aug. 24, 2007, the entire contents of which are hereby incorporated herein by reference.

BACKGROUND

In conventional methods of X-ray imaging, attenuation depends on the type of body tissue scanned and the average energy level of the X-ray beam. The average energy level of the X-ray beam may be adjusted via an X-ray tube's energy setting. An X-ray tube's energy setting is measured in kilovolts (kV).

Conventionally, computed tomography (CT) imaging may be performed using a single energy level (referred to as single energy CT imaging) or dual energy levels (referred to as dual energy imaging). Dual energy images may be acquired using two or more scans of different energies during a single procedure or using one or more energy sources.

In conventional single energy CT imaging, image data is obtained using a single energy value, for example, 120 kV. In conventional dual energy CT imaging, dual image data (e.g., two image data sets or two images) is obtained using two different energy levels (e.g., 80 kV and 140 kV). Dual image data may be obtained concurrently, simultaneously or sequentially. If two different energy levels are used to acquire dual energy images, each of the two sets of image data may have different attenuation characteristics. The difference in attenuation levels allows for classification of elemental chemical compositions of imaged tissues.

Different energy levels may also impact contrast resolution and/or noise characteristics of respective image data. For example, 80 kV image data may provide greater contrast resolution than 140 kV image data. But, the 80 kV image data may be noisier than the 140 kV image data. To exploit potential advantages of, for example, 80 kV image data and 140 kV, in conventional dual energy CT systems, the higher and lower image data may be combined into resultant image data using a linear mixing ratio.

In one example, a conventional linear mixing ratio may be 70/30. In this case, resultant image data may be obtained by blending 70% of a 140 kV image data with a 30% 80 kV image data. Methods for linear blending of image data are well-known in the art. Thus, a detailed discussion will be omitted for the sake of brevity.

In a more specific example, dual energy image data for a pancreas may have somewhat grainy 80 kV images lacking sharp contours, which may be shown in, for example, 120-140 kV images. However, the 80 kV images may have a better contrast resolution than the 120-140 kV images. The better contrast resolution may enable physicians to differentiate between tissues. Thus, in conventional methods of linear combining, benefits of the 80 kV image data and the 120-140 kV image data may be at least partially offset by the drawbacks (e.g., noise) due to the linear nature of the combination.

Conventional linear blending may also provide additional diagnostic information to a viewing physician. However, illustrating the additional diagnostic information to the physician may be potentially problematic because of the drawbacks of the linear combination.

SUMMARY

Example embodiments provide improved blending of at least two sets of image information (e.g., lower and higher image information) such that the benefits of each image information may be appreciated and visualized in a single resultant image. A tunable user interface for physicians (e.g., radiologists) may further enhance diagnosis capabilities. Example embodiments also provide organ and/or pathology specific presets, which may simplify case review.

Example embodiments provide improved blending of image information (e.g., image data) obtained using a plurality of X-ray sources such that the benefits of each image information may be appreciated and/or visualized in a single resultant image.

In at least one example embodiment, the plurality of image data sets may include a first image data set obtained using a first X-ray energy level (e.g., between about 120 kV-about 140 kV, inclusive, however, energy levels higher than 140 kV or lower than 120 kV may be used as well) and a second image data set obtained using a second X-ray energy level (e.g., less than or equal to about 100 kV) The first and second energy levels may be different. The first and second image data may be blended together or combined using a non-linear function to generate resultant image data. A resultant image may be displayed to a user (e.g., a physician, such as a radiologist) via a display.

Example embodiments provide a method for non-linear blending of a plurality of image data sets using a parametric or non-linear function or algorithm.

Methods according to example embodiments provide a temporally and spatially independent resultant image data for generating an image. Each resultant image is generated based on a combination or blend of plurality of image data sets at each voxel. That is, for example, each voxel of a resultant image may have its individual blend of the plurality of image data sets. Each image voxel may be generated independently, and thus, the resultant image may be independent of dimensionality.

Example embodiments also provide a resultant image needing only fine adjustments for viewing different anatomy regions.

At least one example embodiment provides a method for generating an image based on computed tomography data According to at least this example embodiment, a computed tomography image may be generated by blending image data associated with a plurality of X-ray energy levels. The blending may be performed using a non-linear blending function. The computed tomography image may be displayed to a user and/or stored in a memory.

At least one other example embodiment provides a computed tomography (CT) apparatus. The CT apparatus may include a CT unit and a display. The CT unit may be configured to generate a computed tomography image by blending image data associated with a plurality of X-ray energy levels. The blending may be performed using a non-linear blending function. The display may be for displaying the resultant image to the user.

According to at least some example embodiments, first image data may be obtained using X-rays having a first X-ray energy level, and second image data may be obtained using X-rays having a second X-ray energy level. The computed tomography image may be generated by blending the first and second image data using the non-linear function. The first and second X-ray energy levels may be different.

The first and second image data may be blended according to a blending ratio, wherein the computed tomography image may be generated by blending unequal portions of the first image data and the second image data.

According to at least some example embodiments, a blending parameter may be calculated based on the first image data. The blending parameter may be indicative of a blending ratio for blending first and second image data. The computed tomography image may be adjusted by modifying the blending parameter and/or at least one image parameter associated with the computed tomography image. The blending parameter may be a non-linear blending value. The at least one parameter may include at least one of a slice number, viewing window and at least one non-linear blending function parameter. The at least one parameter may include at least one non-linear blending function parameter, the at least one non-linear blending function parameter including at least one of a non-linear blending width and a non-linear blending level of the computed tomography image. The non-linear blending function, width, and/or level may be a moidal blending function, moidal width, and/or moidal level.

According to at least some example embodiments, the first image data may include individual image data associated with each of a plurality of first image voxels, and the second image data may include individual image data associated with each of a plurality of first image voxels. The image data for each first image voxel may be blended with corresponding image data for each second image voxel using the non-linear blending function to generate a plurality of individual resultant image voxels. The computed tomography image may be generated based on the plurality of individual resultant image voxels. The non-linear blending function may be a moidal blending function.

According to at least some example embodiments, the CT unit may further include a first energy source and a second energy source. The first energy source may emit X-rays at a first energy level, and the second energy source may emit X-rays at a second energy level. The CT unit may be further configured to obtain first image data based on X-rays emitted from the first energy source, obtain second image data based on X-rays emitted from the second energy source, and generate the CT image by blending the first and second image data using the non-linear function.

The CT unit may further include a non-linear blending module. The non-linear blending module may be configured to calculate a blending parameter based on the first image data. The blending parameter may be indicative of a blending ratio for blending first and second image data. The non-linear blending module may also generate computed tomography image data by blending the first image data and the second image data based on the blending parameter. The CT unit may generate the computed tomography image based on the computed tomography image data.

BRIEF DESCRIPTION OF THE DRAWINGS

Example embodiments will become more apparent by describing in detail the example embodiments shown in the attached drawings in which.

DETAILED DESCRIPTION OF EXAMPLE EMBODIMENTS

Figure 1:
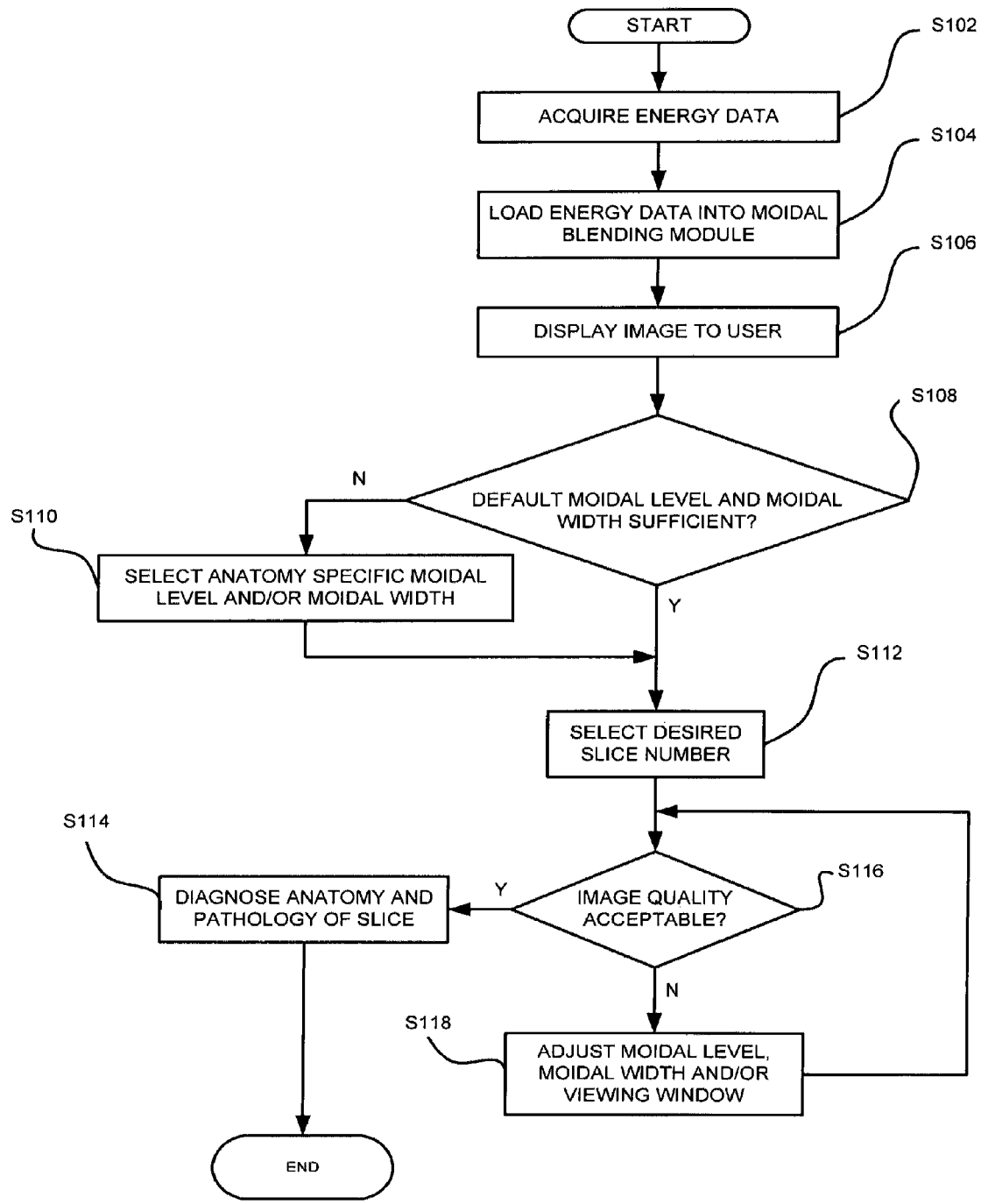
FIG. 1 is a flowchart illustrating a method according to an example embodiment.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although not required, example embodiments will be described in the general context of computer-executable instructions, such as program modules, being executed by one or more computer processors or CPUs. Generally, program modules include routines, programs, objects, components, data structures, etc. that perform particular tasks or implement particular abstract data types. The program modules discussed herein may be implemented using existing hardware in existing CT scanners.

Example embodiments may also be practiced in distributed computing environments where tasks are performed by remote processing devices that are linked. In a distributed computing environment, program modules may be located in both local and remote memory storage devices.

The acts and symbolic representations of operations described herein may be performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

The data structures where data is maintained are physical locations of the memory that have particular properties defined by the format of the data. However, while example embodiments are described in the foregoing context, it is not meant to be limiting as those of skill in the art will appreciate that various acts and operations described hereinafter may also be implemented in hardware.

Example embodiments provide methods for combining a plurality of image data sets obtained using a plurality of energy levels to generate improved image visualization. As described herein, image information, image data and image data set may be used interchangeably, and may refer to image data used to generate and display a corresponding image to a user. Image, on the other hand, may refer to the image displayed to the user.

According to at least one example embodiment, at least two different energy levels may be used to obtain at least two image data sets, and the at least two image data sets may be blended into a single resultant image data set. The single image data set may be used to generate improved image visualization. At least one example embodiment provides a method of organ specific non-linear mixing of image information that improves the blending of both low and high image information to capture the potential benefits of each image data set in a single image.

Figure 2:
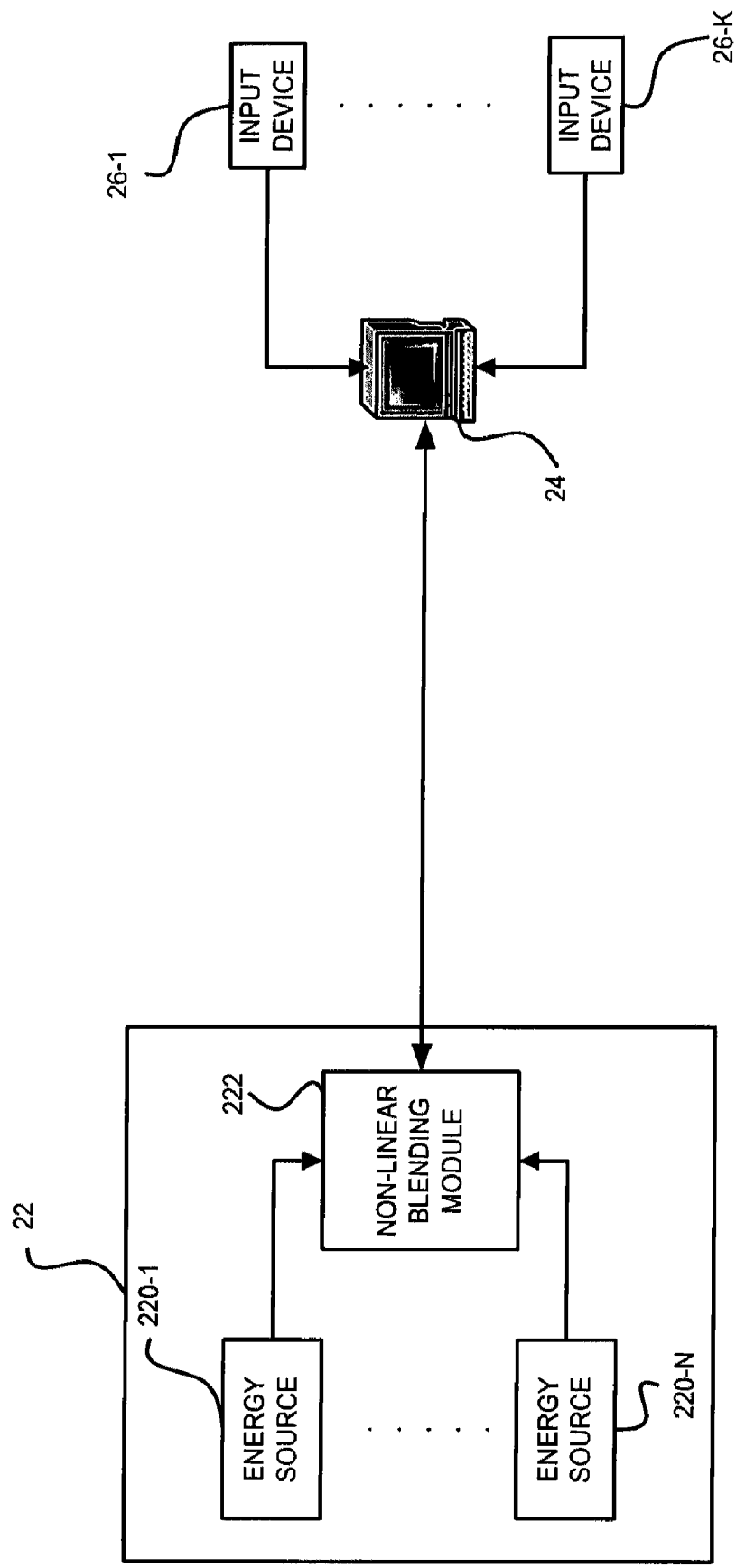
FIG. 2 is a block diagram illustrating a computed tomography (CT) unit according to an example embodiment.

FIG. 1 is a flowchart illustrating a method according to an example embodiment. FIG. 2 is a block diagram illustrating a CT unit according to an example embodiment. The CT unit shown in FIG. 2 may be a dual-energy CT unit and may have similar or substantially similar functionality to CT units as are well-known in the art. But, the CT unit of FIG. 2 may have the additional functionality as described herein. Example embodiments will be described with regard FIGS. 1 and 2 collectively. However, it will be understood that methods according to example embodiments may be implemented in any suitable CT unit.

Although example embodiments will be discussed with regard to being implemented in a CT unit, example embodiments discussed herein may be implemented on any computer. For example, example embodiments may be implemented on a computer completely separate from or integrated with a CT unit. In one example, the methods described herein may be implemented on a conventional personal computer or laptop on which the CT data or images may be loaded.

Referring to FIGS. 1 and 2, at S102, CT scanner 22 may obtain multiple energy data using a plurality of energy sources 220-1-220-N, where N is a natural number. Although FIG. 1 illustrates a plurality of energy sources 220-1-220-N, multiple energy data may be obtained using a single source as described above.

Two or more of the energy sources 220-1-220-N may have different X-ray energy levels. In one example embodiment, the CT scanner 22 may include two energy sources 220-1 and 220-2. However, example embodiments are not limited thereto.

The dual energy data may include a plurality of image data sets, each of which may be obtained using a different X-ray energy level. For example purposes, methods according to example embodiments will be described herein with regard to two image data sets obtained using two different X-ray energy sources 220-1 and 220-2 emitting different X-ray energy levels (e.g., about 80 kV and about 140 kV). The energy levels will be referred to herein as first and second energy levels, and the data sets will sometimes be referred to as first energy image data $I_1$ and second energy image data $I_2$. In example embodiments described herein, the first and second energy levels may be different. For example, the first energy level may be a lower energy level such as about 80 kV, whereas the second energy level may be a higher energy level, for example, about 140 kV.

Returning back to FIGS. 1 and 2, after obtaining the dual energy data, the dual energy data may be loaded into non-linear blending module 222, at S104. The non-linear blending module 222 may be in the form of a software module or computer executable instructions running on the CT unit 22. Alternatively, the non-linear blending module 222 may be in the form of a software module or computer executable instructions running on a personal computer separate from the CT unit 22.

The non-linear blending module 222 may generate resultant image data by blending the first energy image data and the second energy image data according to a non-linear blending function. A method for doing so will be described in more detail below.

In one example, the resultant image data may be generated based on the first energy image data and the second energy image data using a modified sigmoid function, wherein the first and second energy image data are different. Hereinafter, the modified sigmoid function will be referred to as a moidal function, and the method for blending using the moidal function will be referred to as moidal blending. As is well-known in the art, a sigmoid $S$ function is a parametric function described by Equation (1) shown below.

$$s = \frac{1}{1+e^{-x}} \tag{1}$$

According to example embodiments, the moidal blending function may be described by Equation (2) shown below.

$$\mu = \frac{1}{1+e^{-\frac{I_1-\lambda_\mu}{\omega_\mu}}} \tag{2}$$

In equation (2), $\mu$ is referred to as the moidal value, $I_1$ represents the first energy image data (e.g., in Hounsfield Units for image voxels), $\lambda_\mu$ represents the moidal level and $\omega_\mu$ is the moidal width. The moidal value $\mu$ may be referred to as a blending parameter, and may be indicative of a blending ratio for blending image data to generate resultant image data. The blending ratio refers an amount of each of the image data including in the blending of the image data sets. In some examples, a blending ratio may be represented by a percentage. The blending ratio described herein is adaptive, dynamic may vary over time and/or space.

The moidal level $\lambda_\mu$ and the moidal width $\omega_\mu$ may be collectively referred to as moidal function parameters. The moidal function parameters may be organ specific constants, which may be freely adjusted by a user. According to example embodiments, the moidal function parameters may be determined based on organ of interest, object being scanned (person), the scanner, the energies, etc. In one example, for an average person having an abdominal scans using 140 kV and 80 kV energies, a moidal level of 170 and a moidal width of 60 may be sufficient to begin with.

The calculated moidal value may be utilized to generate the resultant image data $I_{Out}$ according to Equation (3) shown below.

$$I_{Out}=I_1*(1-\mu)+I_2*(\mu) \quad (3)$$

In equation (3), $I_2$ represents the second energy image data (e.g., Hounsfield Units for image voxels). As discussed above, the moidal level $\lambda_\mu$ and the moidal width $\omega_\mu$ may be organ specific constants, which may be freely adjusted by a user.

According to example embodiments, Equation (3) may be used to generate resultant image data $I_{Out}$ for each voxel of the resultant image. A resultant image may then be generated based on the image data for each voxel. Methods for generating a resultant image based on resultant image data are well-known in the art, and thus, a detailed discussion for doing so will be omitted for the sake of brevity.

In one example, a resultant image may include a blended image of conventional resolution based on the plurality of images provided to the algorithm. An example resolution is 512×512. In this example, the non-linear blending module may calculate resultant voxel image data $I_{Out}$ for each voxel of the resultant image. Per voxel image data generation is well-known in the art, and as such, a detailed discussion will be omitted for the sake of brevity.

Once $I_{out}$ is obtained, the output image may be generated by displaying $I_{out}$ as is well-known in the art. For example, if for voxel one $I_{out}$ is 75 HU, voxel one with this value may be displayed on the screen. The same procedure may be performed for each of the 512×512 voxels. In other words, once the $I_{out}$ image is generated, the image may be displayed on a screen using well-known methods including conventional intensity scaling, for example.

Figure 3:
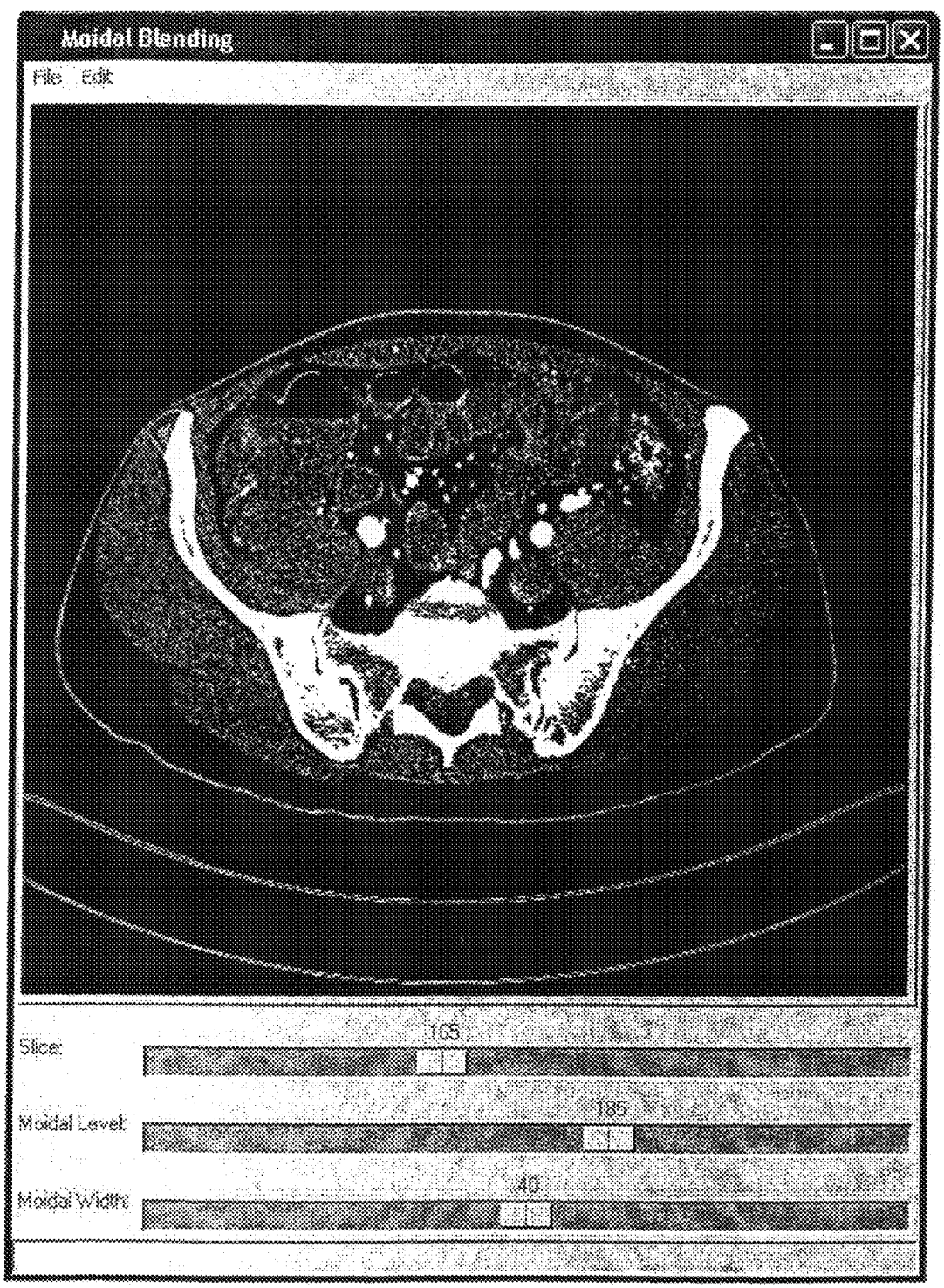
FIG. 3 illustrates an example graphical user interface (GUI) capable of enabling users to change slice number, moidal level and/or moidal width in real time.

Returning back to FIGS. 1 and 2, at S106 a resultant image may be generated and displayed to the user based on the resultant image data generated by the non-linear blending module 222. In at least one example embodiment, the resultant image may be displayed to the user via a graphical user interface (GUI). FIG. 3 illustrates a GUI for displaying the resultant image to the user, according to an example embodiment.

As noted above, FIG. 3 illustrates a GUI enabling users to change image parameters in real time. Image parameters may include for example, slice number, viewing window/level and/or moidal function parameters. As discussed above, moidal function parameters may further include moidal level and/or moidal width.

Utilizing the GUI to vary one or more of the image parameters in real-time may enable a physician to improve the detection of an anatomy and/or pathology of interest. The image parameters (e.g., slice number, moidal level and/or moidal width) may be changed using input devices 26-1-26-K. The input devices 26-1-26-K may include at least one of a keyboard, a mouse, etc.

Returning to FIGS. 1 and 2, if the user is not satisfied with the default moidal function parameters (e.g., the moidal level and/or moidal width) at S108, the user may select anatomy specific moidal function parameters (e.g., anatomy specific moidal level and/or moidal width) at S110 as described above. The user may determine whether the default moidal function parameters are sufficient based on the displayed image.

For example, if the image is not sufficiently clear for the intended anatomy or pathology diagnosis, the user may determine that an anatomy specific moidal level and/or moidal width is necessary. On the other hand, if the image is sufficiently clear for the intended anatomy or pathology diagnosis, the user may determine that an anatomy or pathology specific moidal level and/or moidal width is not necessary. Anatomy or pathology specific moidal levels and/or widths may be specified by the user.

Still referring to FIGS. 1 and 2, after selecting an anatomy specific moidal level and/or moidal width at S110, the user may select a desired slice number at S112 via the GUI as described above. As is well-known in the art, a slice is a single cross section through the object with acquisition specific resolution. The selection of the slice may be used to further improve the displayed image.

If the image quality is acceptable at S116, the user may continue with diagnosis of the anatomy and pathology of the selected slice. The image quality determination at S116 may be performed in the same or substantially the same manner as at S108.

Returning to S116, if the image quality is unacceptable, the image parameters (e.g., moidal level, moidal width, slice number and/or viewing window) may be adjusted at S118. One or more of these adjustments may be made selectively via the computer display 24, for example, using a graphical user interface (GUI). For example, the user may adjust image parameters via the GUI based on the displayed image.

After adjusting the image parameters, the method proceeds to S116 and continues as described above.

Returning to S108 in FIG. 1, if the default moidal function parameters are sufficient, the method proceeds to S112, and continues as described above.

Figure 4:
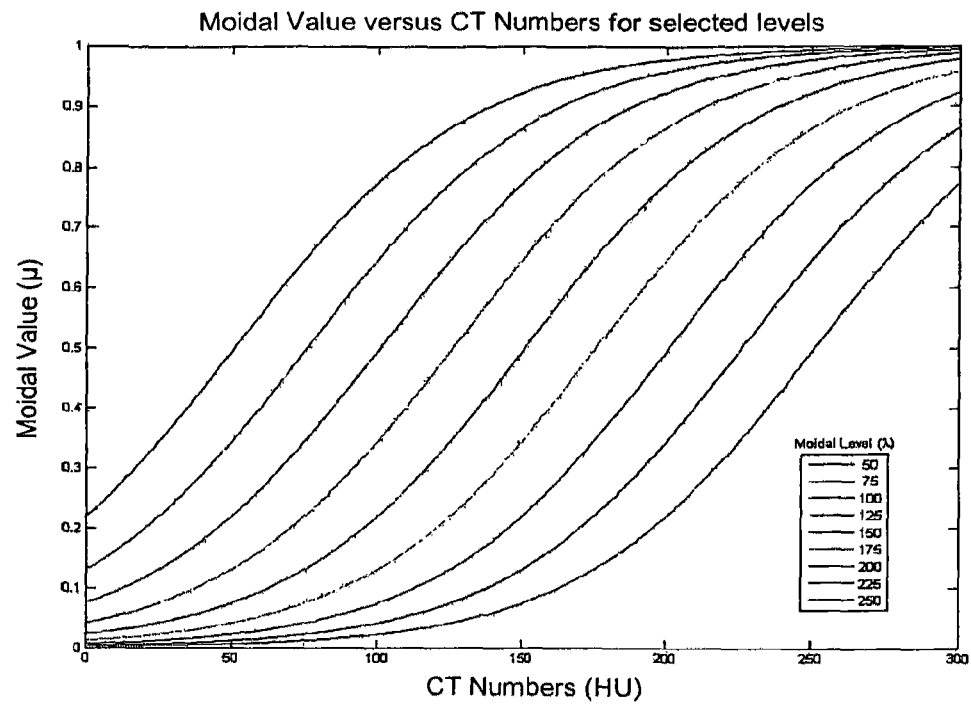
FIG. 4 shows two graphs (a) and (b), which illustrate the moidal level and/or moidal width dependence of example embodiments.
Figure 4:
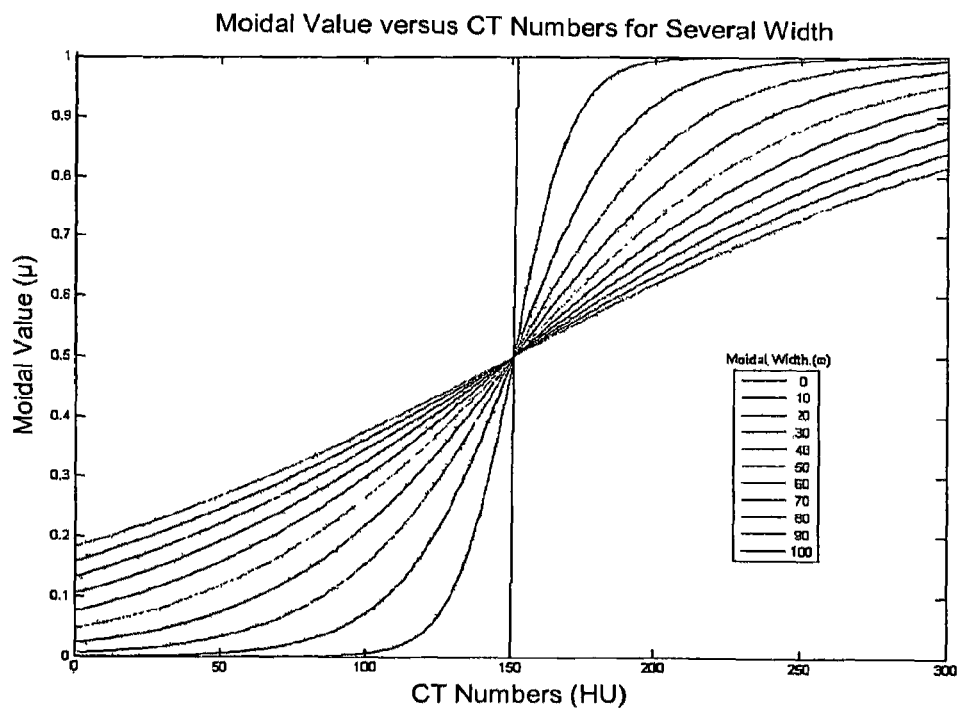

FIG. 4 shows two graphs (a) and (b), which illustrate the moidal function parameter dependence of methods according to example embodiments. As will be appreciated from graphs (a) and (b), the high energy image information lies above the moidal curve and the low energy image information lies below the curve.

Graph (a) in FIG. 4 illustrates that an increase in moidal level $\lambda_\mu$ may provide an output image $I_{Out}$ that utilizes an increased amount of high energy image information. Lowering the moidal level $\lambda_\mu$, on the other hand, may increase the amount of information taken from the low energy image information.

Graph (b) illustrates the impact of adjusting the moidal Width $\omega_\mu$. As shown, if the Moidal Width $\omega_\mu$ is about 0, the non-linear blending function or algorithm functions in a thresholding manner. For example, anything above the Moidal Level may be taken (or constitutes a greater contribution) from the first energy image and anything below may be taken from the second energy image. The Moidal Level may function as a separator (or threshold) between first and second energy image information used as input for the $I_{out}$. On the other hand, a moidal width $\omega_\mu$ of about 100 functions in a linear blending manner. That is, for example, the non-linear function having a moidal width of 100 may be relatively close to the limit of the moidal width approaching infinity. In this case, the blending function may seem linear in the range of values common to CT (e.g., about −2000 to about 2000).

Although described herein with regard to an example moidal blending technique, example embodiments may be implemented using alternative non-linear blending functions, such as, a Gaussian, piece-wise linear, parabolic, similar function, composition of several functions or the like.

Although not specifically discussed herein, image data may be processed prior to non-linear mixing. For example, the obtained image data may be registered, filtered, reconstructed, etc. In this case, the obtained image data is computed tomography derived image data, and the resultant image is a computed tomography derived image.

Methods according to example embodiments may be machine implemented via one or more computers or processors. In addition, the systems discussed herein may be embodied in the form of one or more computers configured to carry out methods described herein.

Example embodiments may also be implemented, in software, for example, as any suitable computer program. For example, a program in accordance with one or more example embodiments of the present invention may be a computer program product causing a computer to execute one or more of the example methods described herein: a method for determining a parameter in a system for implementing a future clinical study.

The computer program product may include a computer-readable medium having computer program logic or code portions embodied thereon for enabling a processor of the apparatus to perform one or more functions in accordance with one or more of the example methodologies described above. The computer program logic may thus cause the processor to perform one or more of the example methodologies, or one or more functions of a given methodology described herein.

The computer-readable medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

These programs may also be provided in the form of an externally supplied propagated signal and/or a computer data signal (e.g., wireless or terrestrial) embodied in a carrier wave. The computer data signal embodying one or more instructions or functions of an example methodology may be carried on a carrier wave for transmission and/or reception by an entity that executes the instructions or functions of the example methodology. For example, the functions or instructions of the example embodiments may be implemented by processing one or more code segments of the carrier wave, for example, in a computer, where instructions or functions may be executed for determining a parameter in a system for implementing a future clinical study, in accordance with example embodiments described herein.

Further, such programs, when recorded on computer-readable storage media, may be readily stored and distributed. The storage medium, as it is read by a computer, may enable the methods and/or apparatuses, in accordance with the example embodiments described herein.

Example embodiments being thus described, it will be obvious that the same may be varied in many ways. For example, the methods according to example embodiments of the present invention may be implemented in hardware and/or software. The hardware/software implementations may include a combination of processor(s) and article(s) of manufacture. The article(s) of manufacture may further include storage media and executable computer program(s), for example, a computer program product stored on a computer readable medium.

The executable computer program(s) may include the instructions to perform the described operations or functions. The computer executable program(s) may also be provided as part of externally supplied propagated signal(s). Such variations are not to be regarded as departure from the spirit and scope of the example embodiments, and all such modifications as would be obvious to one skilled in the art are intended to be included within the scope of the following claims.

The present invention being thus described, it will be obvious that the same may be varied in many ways. Such variations are not to be regarded as a departure from the invention, and all such modifications are intended to be included within the scope of the present invention.

We claim:

1. A method for generating an image based on computed tomography data, the computed tomography data including at least first image data and second image data, the first image data including individual image data associated with each of a plurality of first image voxels, and the second image data including individual image data associated with each of a plurality of second image voxels, the first image data being obtained using X-rays having a first X-ray energy level, and the second image data being obtained using X-rays having a second energy level, the method comprising:

generating a plurality of individual resultant image voxels by blending image data for each of the plurality of first image voxels with corresponding image data for each of the plurality of second image voxels using a non-linear blending function, the non-linear blending function being based on a non-linear blending parameter indicative of a non-linear blending ratio for blending the first image data and the second image data; and generating the image based on the plurality of individual resultant image voxels.

2. The method of claim 1, wherein the first and second X-ray energy levels are different.

3. The method of claim 1, wherein the first and second image data are blended according to the non-linear blending ratio, and wherein the computed tomography image is generated by blending unequal portions of the first image data and the second image data.

4. The method of claim 1, further comprising:

calculating the non-linear blending parameter based on the first image data, wherein the image is generated by blending the first image data and the second image data based on the non-linear blending parameter.

5. The method of claim 4, further comprising:

adjusting the image by modifying the non-linear blending parameter.

6. The method of claim 4, wherein the non-linear blending parameter is a non-linear value µ, the non-linear value µ being calculated according to the following equation:

$$\mu = \frac{1}{1+e^{-\frac{I_1 - \lambda_\mu}{\omega_\mu}}}; \text{wherein}$$

$I_1$ represents the first image data, $\lambda_\mu$ represents a non-linear level and $\omega_\mu$ represents a non-linear width associated with the first image data.

7. The method of claim 4, wherein the generating generates the image $I_{Out}$ based on the following equation:

$$I_{Out} = I_1 * (1-\mu) + I_2 * (\mu); \text{wherein}$$

$I_1$ represents the first image data, $I_2$ represents the second image data, and µ represents the non-linear blending parameter.

8. The method of claim 1, further comprising:
adjusting the image by modifying the non-linear blending parameter associated with each individual resultant image voxel.

9. The method of claim 1, further comprising:
adjusting the image by modifying at least one image parameter associated with each individual resultant image voxel.

10. The method of claim 1, further comprising:
adjusting the image by modifying at least one image parameter associated with the image.

11. The method of claim 10, wherein the at least one image parameter includes at least one of a slice number, viewing window or level and at least one non-linear function parameter.

12. The method of claim 10, wherein the at least one image parameter includes at least one non-linear function parameter, the at least one non-linear function parameter including at least one of a non-linear width and a non-linear level of the image.

13. The method of claim 1, further comprising:
at least one of storing or displaying the image to a user.

14. An apparatus to generate an image based on computed tomography data, the computed tomography data including at least first image data and second image data, the first image data including individual image data associated with each of a plurality of first image voxels, and the second image data including individual image data associated with each of a plurality of second image voxels, the first image data being obtained using X-rays having a first X-ray energy level, and the second image data being obtained using X-rays having a second energy level, the apparatus comprising:

a processing unit to generate a plurality of individual resultant image voxels by blending image data for each of the plurality of first image voxels with corresponding image data for each of the plurality of second image voxels using a non-linear blending function, the non-linear blending function being based on a non-linear blending parameter indicative of a non-linear blending ratio for blending the first image data and the second image data, the processing unit being further configured to generate based on the plurality of individual resultant image voxels.

15. The apparatus of claim 14, further comprising:
a CT unit useable to,
obtain the first image data based on X-rays emitted at the first energy level, and
obtain the second image data based on X-rays emitted at the second energy level.

16. The apparatus of claim 15, wherein the first and second energy levels are different.

17. The apparatus of claim 14, wherein the first and second image data are blended according to the non-linear blending ratio, the processor unit being further useable to generate the image by blending unequal portions of the first image data and the second image data.

18. The apparatus of claim 15, wherein the processor unit further comprises:
a non-linear blending module to,
calculate the non-linear blending parameter based on the first image data, and
generate resultant image data by blending the first image data and the second image data based on the non-linear blending parameter, wherein the processor unit is useable to generate the image based on the resultant image data.

19. The apparatus of claim 18, wherein the non-linear blending module is useable to generate the resultant image data $I_{Out}$ based on the following equation:

$$I_{Out} = I_1 * (1-\mu) + I_2 * (\mu); \text{wherein}$$

$I_1$ represents the first image data, $I_2$ represents the second image data, and µ represents the non-linear blending parameter.

20. The apparatus of claim 15, wherein the processor unit is further useable to adjust the image by modifying at least one image parameter associated with the computed tomography image via an input device.

21. The apparatus of claim 14, wherein the processor unit is further useable to adjust the image by modifying at least one of the non-linear blending parameter and an image parameter associated with the image.

22. The apparatus of claim 14, further comprising:
a display to display the generated image.

* * * * *